United States Patent [19]

Sogo

[11] Patent Number: 5,230,009
[45] Date of Patent: Jul. 20, 1993

[54] METHOD FOR DECIDING REGION OF PI/4 SHIFT QUADRIPHASE SHIFT KEYING MODULATED SIGNALS

[75] Inventor: Akira Sogo, Hamamatsu, Japan

[73] Assignee: Yamaha Corporation, Hamamatsu, Japan

[21] Appl. No.: 727,540

[22] Filed: Jul. 9, 1991

[30] Foreign Application Priority Data

Jul. 10, 1990 [JP] Japan .................................. 2-182084

[51] Int. Cl.$^5$ ............................................. H04L 27/22
[52] U.S. Cl. ........................................ 375/86; 329/304
[58] Field of Search .......................... 375/83, 85, 86; 329/304; 455/60

[56] References Cited

U.S. PATENT DOCUMENTS

| | | | |
|---|---|---|---|
| 4,631,486 | 12/1986 | Snell | 329/304 |
| 4,881,049 | 11/1989 | Yagi | 329/304 |
| 5,057,786 | 10/1991 | Yoshikawa | 329/304 |
| 5,067,139 | 11/1991 | Baker et al. | 375/86 |
| 5,079,512 | 1/1992 | Muto | 329/304 |

Primary Examiner—Curtis Kuntz
Assistant Examiner—Vijay Shankar
Attorney, Agent, or Firm—Burns, Doane, Swecker & Mathis

[57] ABSTRACT

First two dimensional plane is defined by phase of modulated signal and first vector corresponding to first signal point to be decided is defined. Then, first inner product by the first vector and second vector corresponding to last decided signal point is made and the second vector is transformed into third vector which is ninety degrees advanced. Next, second inner product of the first vector and third vector is made and the region of the first signal is decided in the two dimensional plane in accordance with the first and second inner product.

4 Claims, 6 Drawing Sheets

METHOD FOR DECIDING REGION OF PI/4 SHIFT QUADRIPHASE SHIFT KEYING MODULATED SIGNALS

BACKGROUND OF THE INVENTION

1. Field of the Invention

The present invention relates to a method for deciding region of $\pi/4$ shift quadriphase shift keying (QPSK) modulated signals used for demodulation of a signal which modulated by $\pi/4$ shift QPSK modulating method.

2. Prior Art

Figure 6:
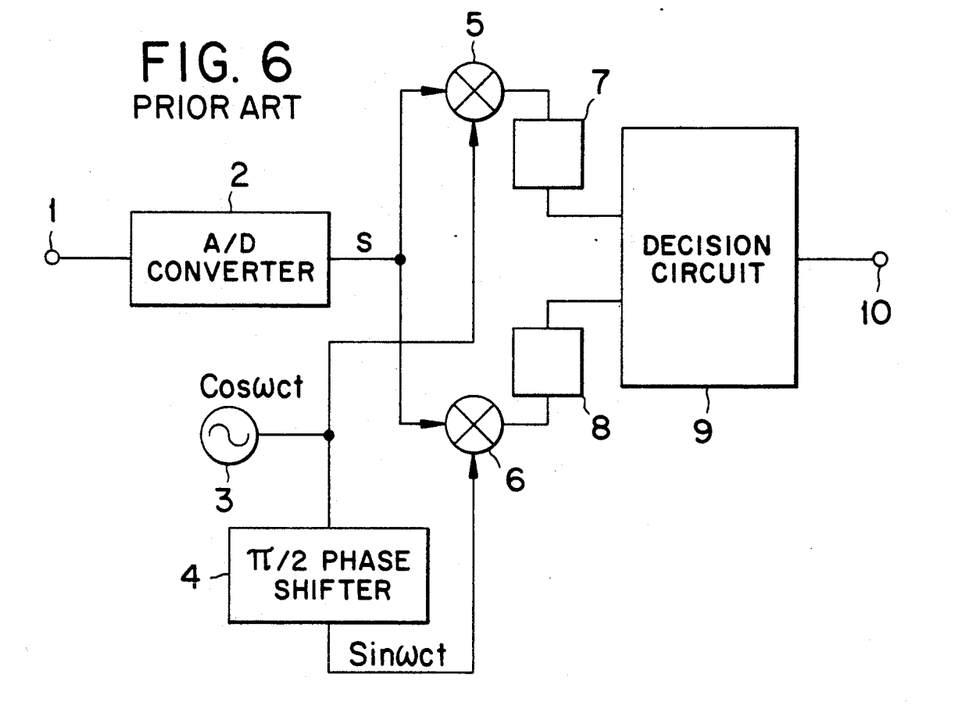
FIG. 6 is showing a block diagram of a configuration of a conventional decision apparatus for $\pi/4$ shift QPSK modulated signals.

FIG. 6 shows a block diagram of the structure of a usual decision apparatus of prior art for $\pi/4$ shift QPSK modulated signals. According to this FIG. 6, an input signal is provided by input terminal 1, an A/D converter 2 coverts the input signal to a digital signal S, a signal $\cos(\omega ct)$ is produced by a generator 3, a $\pi/2$ phase shifter 4 generates a signal $\sin(\omega ct)$ by shifting the phase of the signal $\cos(\omega ct)$ by $\pi/2$.

Figure 7:
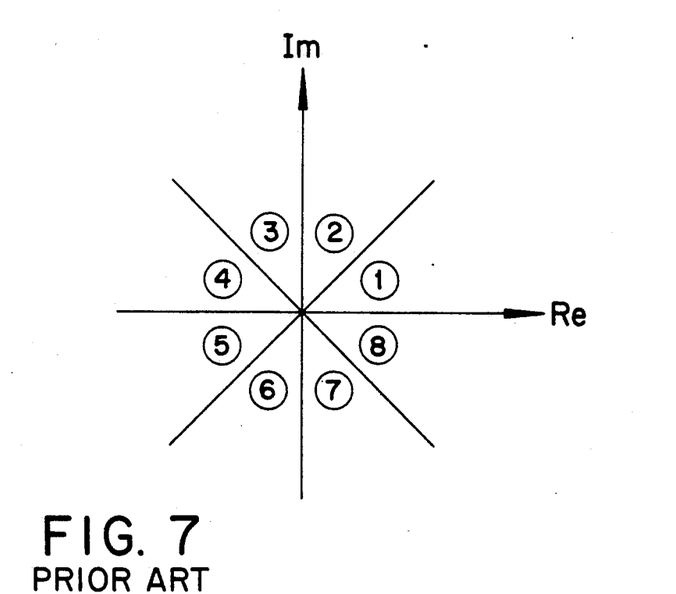
FIG. 7 is showing an example of the phase space divided in eight sections.

A mixer 5 multiplies the signal S and the signal $\cos(\omega ct)$, a mixer 6 multiplies the signal S and the signal $\sin(\omega ct)$, low pass filters (LPF) 7 and 8 respectively limit the bandwidth of the output signals of the mixers 5 and 6, a decision circuit 9 decides on the basis of the output signals from the LPF 7 and 8 to which of the 8 parts of the phase space, indicated in FIG. 7, the input signal belongs to, the decision result coming from the decision circuit 9 is put out to a output terminal 10.

Figure 8:
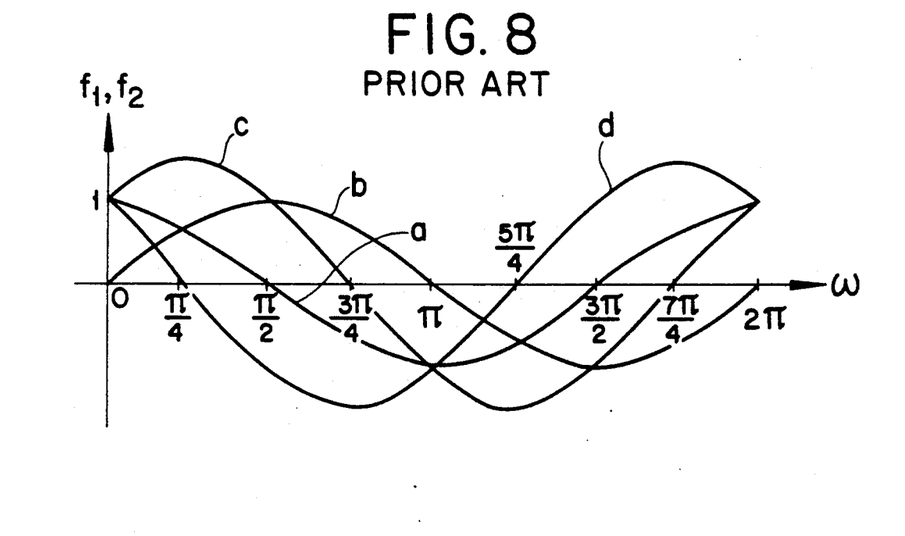
FIG. 8 is showing an example of a collection of 4 signal waveforms.

Furthermore, the decision of the decision circuit 9 is carried out as shown below. In FIG. 8, four waveforms are shown, they correspond to the four equations listed below. In FIG. 8, a curved line a corresponds to wavefunction (1), a curved line b corresponds to wavefunction (2), a curved line c corresponds to wavefunction (3) and a curved line d corresponds to wavefunction (4).

$$f_1 = \cos(\omega) \quad (1)$$

$$f_2 = \sin(\omega) \quad (2)$$

$$f_3 = f_1 + f_2 = \cos(\omega) + \sin(\omega) \quad (3)$$

$$f_4 = f_1 - f_2 = \cos(\omega) - \sin(\omega) \quad (4)$$

Figure 9:
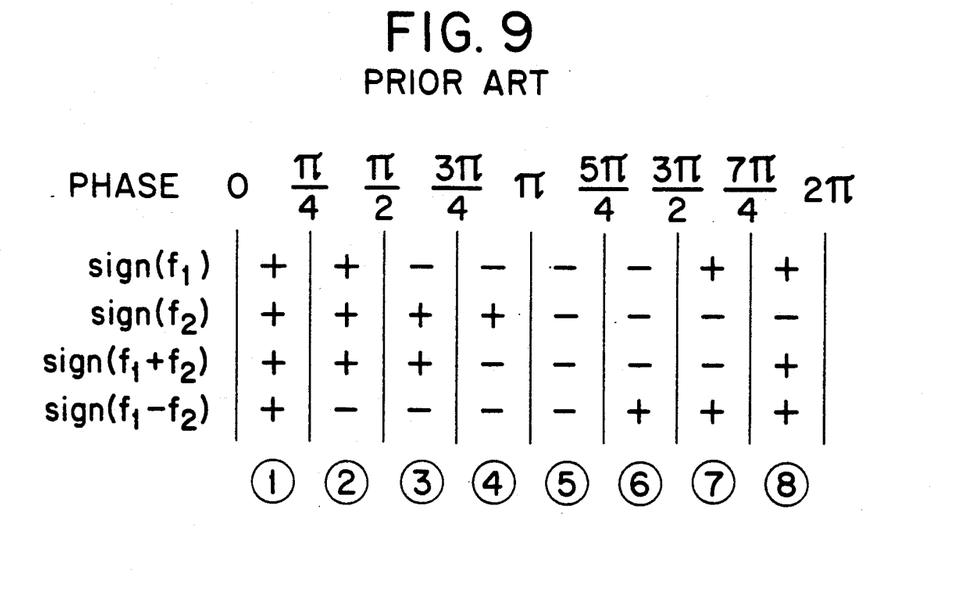
FIG. 9 is showing the sign of each phase of the 4 signal waveforms shown in FIG. 8.

In FIG. 9, the signs of $sign(f_1)$, $sign(f_2)$, $sign(f_1+f_2)$, $sign(f_1-f_2)$ which correspond to functions (1) to (4) are listed while the phase angle varies from 0 to $2\times\pi$.

Consequently, when the output signals from the LPF 7 and 8 as well as their computed sign combinations coincide with one of the combinations shown in FIG. 9, the decision circuit 9 decides to which of the eight areas 1 to 8 of FIG. 7 the input signal belongs to.

Figure 10:
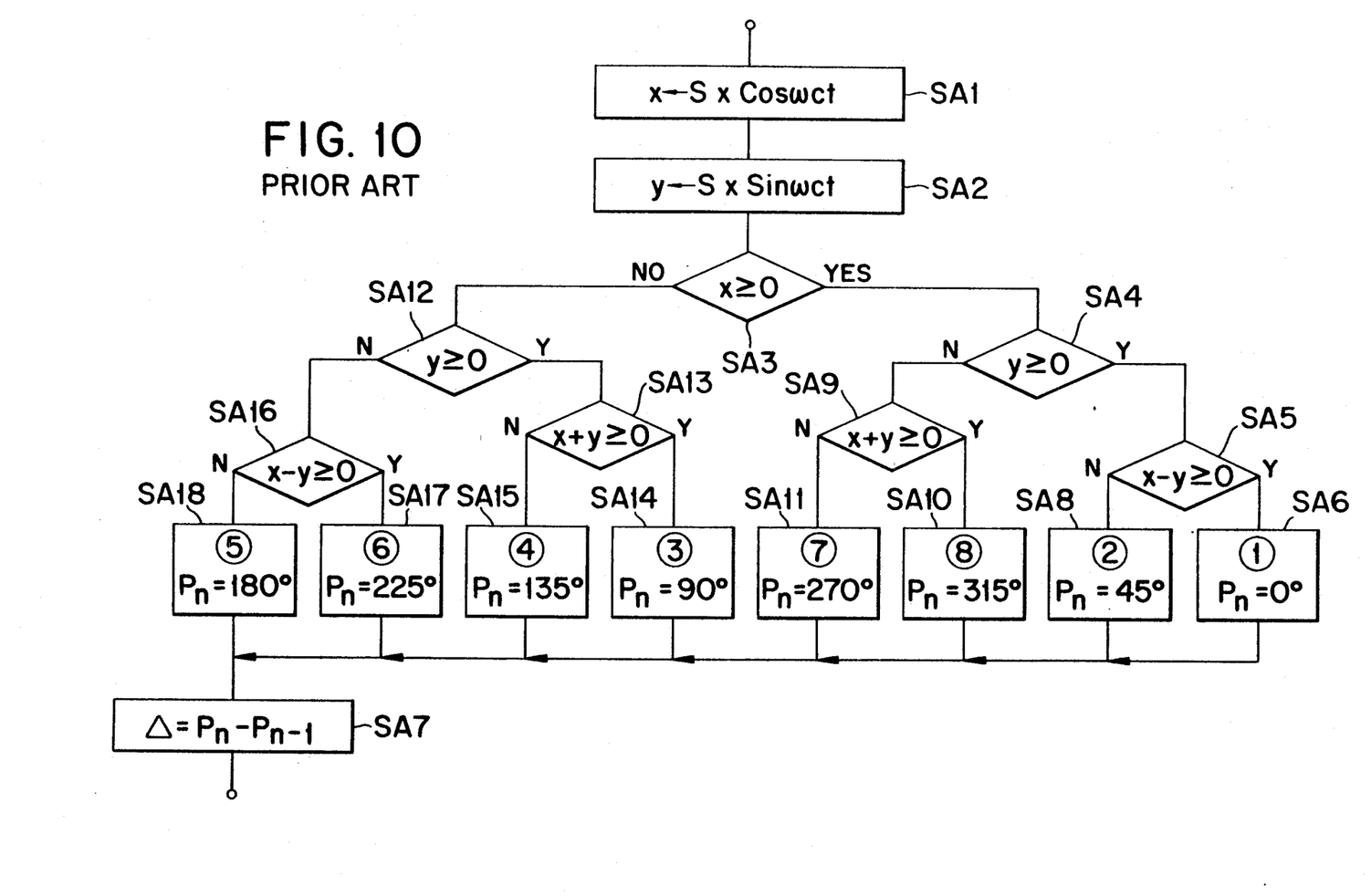
FIG. 10 is a flow chart showing the decision procedure on the input signal done by the decision circuit 9 shown FIG. 6.

With the decision apparatus as described above, an explanation about the way of operation of the decision of the decision circuit 9 on the input signal is described with reference to a flow chart shown FIG. 10. First, the input signal inputted from the input terminal 1 is converted to the digital signal S in the A/D converter 2. Next, the digital signal S is multiplied by the signal $\cos(\omega ct)$ in the mixer 5 and the multiple result outputs as a signal $S\times\cos(\omega ct)$ from the mixer 5. Concurrently, the digital signal S is multiplied by the signal $\sin(\omega ct)$ in the mixer 6 and the multiple result outputs as a signal $S\times\sin(\omega ct)$ from the mixer 6. Then the decision circuit 9 proceeds with step SA1 (see FIG. 10) and substitutes the signal $S\times\cos(\omega ct)$ for a variable x and proceeds with step SA2.

In step SA2, the signal $S\times\sin(\omega ct)$ is substituted for the variable y and step SA3 follows next.

In step SA3, it is decided whether the variable x is not negative. If the result of this decision is "Yes", step SA4 follows next.

In step SA4, it is decided whether the variable y is not negative. If the result of this decision is "Yes", step SA5 follows next.

In step SA5, it is decided whether a difference $(x-y)$ of the two variables x and y is not negative. If the result of this decision is "Yes", step SA6 follows next.

In step SA6, it is decided that, according to FIG. 9, the input signal falls into area 1 of FIG. 7, then an assigning phase $P_n=0$ degree and step SA7 follows next.

In step SA7, a phase difference $(\Delta = P_n - P_{n-1})$, where $P_n$ is the phase of the existing input signal and $P_{n-1}$ is the phase of the previous input signal, is obtained and is outputted from the output terminal 10 of FIG. 6 as the result of the decision, then this a whole operating cycle is finished.

If on the other hand the result of the decision of step SA5 is "No", that is, the difference of the variable x and the variable y, the difference $(x-y)$ is less than 0 step SA8 follows next.

In step SA8, it is decided that, according to FIG. 9, the input signal falls into area 2 of FIG. 7, then the assigning phase $P_n=45$ degrees and step SA7 follows next.

If on the other hand the result of the decision of step SA4 is "NO", that is, the variable y is less than 0, step SA9 follows next.

In step SA9, it is decided whether a sum $(x+y)$ of the two variables x and y is not negative. If the result of this decision is "Yes", step SA10 follows next.

In step SA10, it is decided that, according to FIG. 9, the input signal falls into area 8 of FIG. 7, then the assigning phase $P_n=315$ degrees and step SA7 follows next.

If on the other hand the result of the decision of step SA9 is "No", that is, the sum of the variables x and y, the sum $(x+y)$ is less than 0, step SA11 follows next.

In step SA11, it is decided that, according to FIG. 9, the input signal falls into area 7 of FIG. 7, then the assigning phase $P_n=270$ degrees and step SA7 follows next.

If on the other hand the result of the decision of step SA3 is "No", that is, the variable x is less than 0, step SA12 follows next.

In step SA12, it is decided whether the variable y is not negative. If the result of this decision is "Yes", step SA13 follows next.

In step SA13, it is decided whether the sum $(x+y)$ of the two variables x and y is not negative. If the result of this decision is "Yes", step SA14 follows next.

In step SA14, it is decided that, according to FIG. 9, the input signal falls into area 3 of FIG. 7, then assigning phase $P_n=90$ degrees, step SA7 follows next.

If on the other hand the result of the decision of step SA13 is "No", that is, the sum of the variable x and variable y, the sum $(x+y)$ is less than 0, step SA15 follows next.

In step SA15, it is decided that, according to FIG. 9, the input signal falls into area 4 of FIG. 7, then the assigning phase $P_n=135$ degrees and step SA7 follows next.

If on the other hand the result of the decision of step SA12 is "No", that is, the variable y is less than 0, step SA16 follows next.

In step SA16, it is decided whether the difference (x−y) of the two variables x and y is not negative. If the result of this decision is "Yes", step SA17 follows next.

In step SA17, it is decided that, according to FIG. 9, the input signal falls into area 6 of FIG. 7, then the assigning phase $P_n=225$ degrees and step SA7 follows next.

If on the other hand the result of the decision of step SA16 is "No", that is, the difference of the variable x and variable y, the difference (x−y) is less than 0, step SA18 follows next.

In step SA18, it is decided that, according to FIG. 9, the input signal falls into area 5 of FIG. 7, then the assigning phase $P_n=180$ degrees and step SA7 follows next.

By the way, the above mentioned prior art about a decision apparatus for $\pi/4$ shift QPSK modulated signals had the weak point of involving a mere 45 degrees phase margin in it's decision.

Moreover, if the decision circuit 9 uses a Digital Signal Processor (DSP) and processes the above mentioned operation by software, the problem was that the DSP processing software is complicated.

SUMMARY OF THE INVENTION

In consideration of the above, it is an object of the present invention to provide a method for deciding region of $\pi/4$ shift QPSK modulated signals which is capable of improving the phase margin related with the decision and implementing by a small number of instructions.

So as to achieve the above stated object, the present invention provides a method for deciding region in which a modulated serial signal using $\pi/4$ shift QPSK modulating belonging comprising the steps of:

providing two dimensional plane defined by phase of modulated signal;

defining first vector corresponding to first signal point to be decided;

making first inner product by the first vector and second vector corresponding to last decided signal point;

transforming the second vector into third vector which is ninety degrees advanced;

making second inner product of the first vector and third vector;

deciding the region of the first signal in the two dimensional plane in accordance with the first and second inner product making step.

According to the present invention, first two dimensional plane is defined by phase of modulated signal.

Next, first vector corresponding to first signal point to be decided is defined.

Then, first inner product by the first vector and second vector corresponding to last decided signal point is made.

And, the second vector is transformed into third vector which is ninety degrees advanced.

Next, second inner product of the first vector and third vector is made.

Then, the region of the first signal is decided in the two dimensional plane in accordance with the first and second inner product.

According to the present invention, there is such an advantage that it is possible to improve the phase margin related with the decision on the input signal.

And because all of the processing can be done by DSP, there is the advantage of doing this by suitable LSI-application.

Furthermore, DSP-software-processing has also the advantage that it can be easily simplified.

DETAILED DESCRIPTION OF THE PREFERRED EMBODIMENTS

Before explaining the present invention with a preferred embodiment, an explanation about the basic idea concerning the solution of the above mentioned problem is given.

Figure 3:
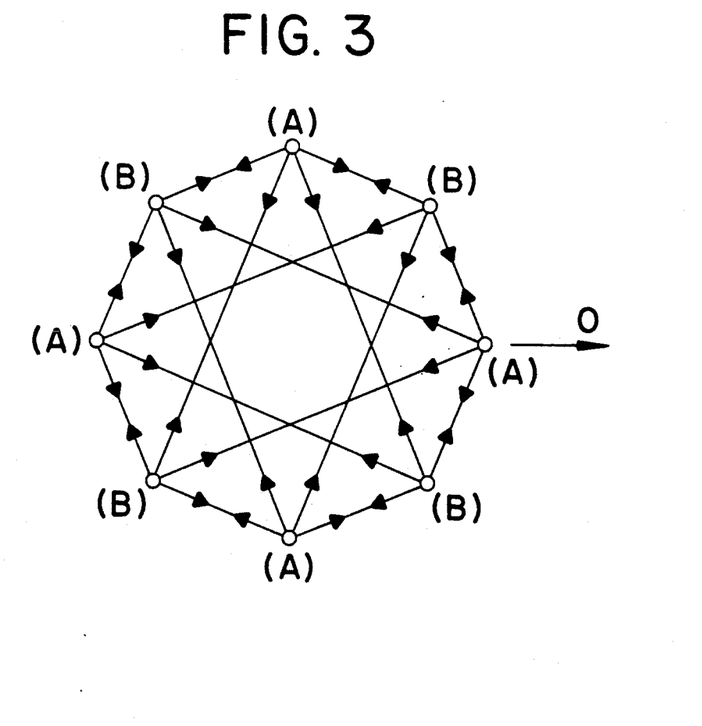
FIG. 3 is showing a configuration of the signal space of the $\pi/4$ shift QPSK.

First, FIG. 3 shows a configuration of the signal space of the $\pi/4$ shift QPSK. When the signal points of FIG. 3 are divided in two groups, namely A (0 deg, 90 deg, 180 deg, 270 deg) and B (45 deg, 135 deg, 225 deg, 315 deg), it can be seen from FIG. 3 that there exists a rule for the transition from one signal point to the next one, such as every signal point from either group A or B comes out in the corresponding opposite group. Now, when the signal point to be decided at present is called $D_n$ and the signal point before $D_{n-1}$, and for example a signal point $D_{n-1}$ is in 45 deg position, in other words a member of group B, then the signal point $D_n$ should become a member of group A in 0 deg, 90 deg, 180 deg or 270 deg position.

When you imagine the signal point $D_n$ and $D_{n-1}$ as the endings of vectors originating in the Origin O, then an inner product IP can be calculated as follows.

$$IP = \overrightarrow{D_{n-1}} \times \overrightarrow{D_n} = |\overrightarrow{D_{n-1}}| \times |\overrightarrow{D_n}| \cos(\theta) \tag{5}$$

Provided that $\theta$ is an angle between vector $\overrightarrow{D_{n-1}}$ and $\overrightarrow{D_n}$. And when in the equation (5) the components of vector $\overrightarrow{D_{n-1}}$ are (a,b) and those of vector $\overrightarrow{D_n}$ are (c,d) then the following equation can be written.

$$IP = a \times c + b \times d \tag{6}$$

Figure 4:
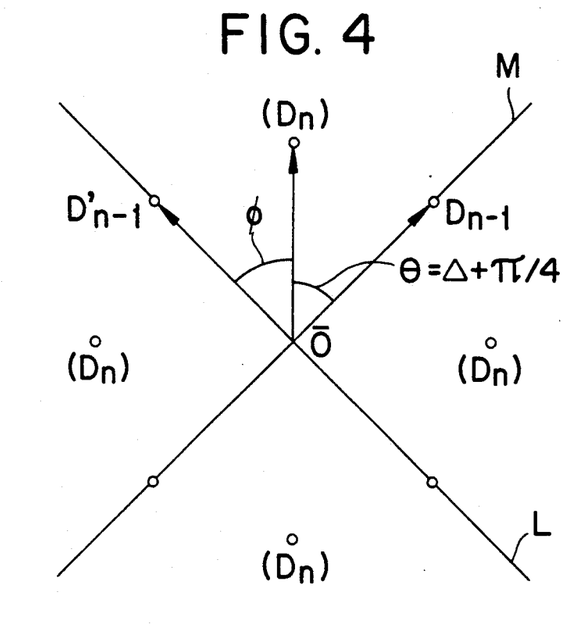
FIG. 4 is showing a decided area of the signal point $D_n$ based on the signal point $D_{n-1}$.

Then after deciding whether a sign of the inner product IP becomes + or −, a line of decision L, as shown in FIG. 4, can be drawn.

Next, after getting vector $\vec{D'_{n-1}}$ by rotating the vector $\vec{D_{n-1}}$ by 90 degrees, an inner product IP' of the vector $\vec{D_n}$ and the vector $\vec{D'_{n-1}}$ can be calculated as shown in the next equation.

$$IP' = \vec{D'_{n-1}} \times \vec{D_n} = |\vec{D'_{n-1}}| \times |\vec{D_n}| \cos(\theta) \quad (7)$$

$\theta$ is an angle between the vector $\vec{D'_{n-1}}$ and $\vec{D_n}$. Because the vector $\vec{D'_{n-1}}$ derives from the vector $\vec{D_{n-1}}$ rotated by 90 degrees, its components become $(-b, a)$ and the equation (7) can be written with the following equation.

$$IP' = -b \times c + a \times d \quad (8)$$

And similarly, after deciding whether the sign of the inner product IP' becomes + or −, the line of decision M as shown in FIG. 4, can be drawn.

By using the above explained lines L and M, it can be decided to which area of group A, which consists of 0 deg, 90 deg, 180 deg, 270 deg, the signal point $D_n$ belongs to.

Figure 5:
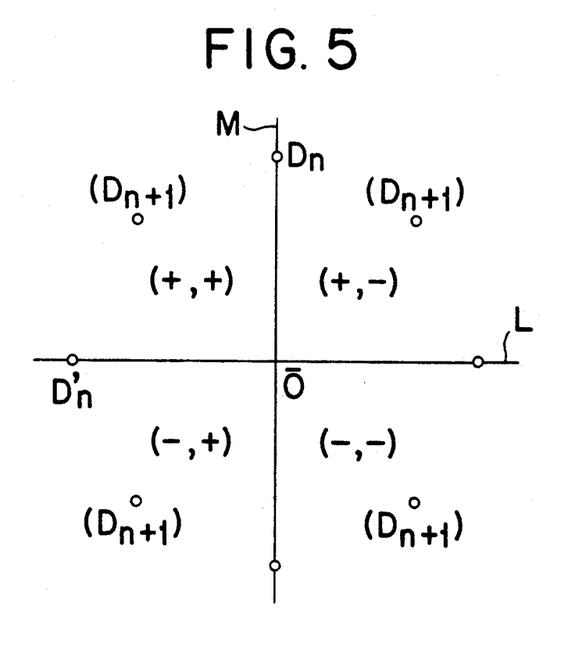
FIG. 5 is showing a decided area of the signal point $D_{n+1}$ based on the signal point $D_n$.

Further on, when the next vector $\vec{D_{n+1}}$, which corresponds to a signal point $D_{n+1}$, and the vector $\vec{D_n}$, which corresponds to the just decided signal point $D_n$, are processed in the same manner, the decision area as shown in FIG. 5 is obtained.

Referring to the drawings, an explanation of a preferred embodiment of the decision circuit of the $\pi/4$ shift QPSK modulated signals in accordance with the present invention will be given. The components of vector $\vec{D_n}$, which correspond to the present signal point $D_n$, which is to be determined, are set to $(x(n), y(n))$, and the components of vector $\vec{D_{n-1}}$, which correspond to the former signal point $D_{n-1}$ are set to $(x(n-1), y(n-1))$.

Figure 1:
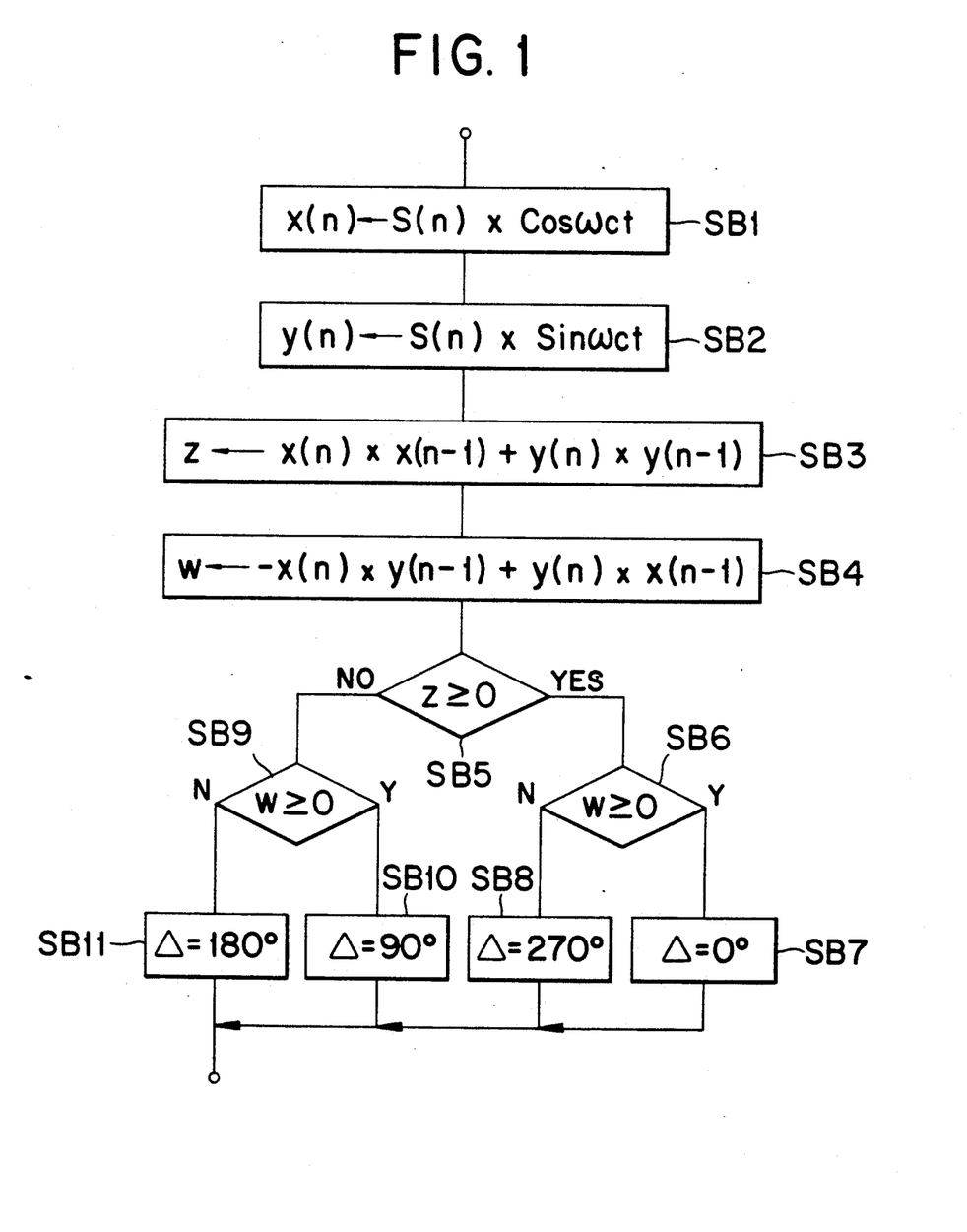
FIG. 1 is a flow chart showing the decision procedure on an input signal by a decision circuit of the preferred embodiment of the present invention.

First, a input signal is converted into a digital signal $S(n)$ by the A/D converter and then step SB1 of the processing follows (see FIG. 1). The signal $S(n)$ and a carrier signal $\cos(\omega ct)$ are multiplied. A multiple result, namely the signal $S(n) \times \cos(\omega ct)$ is substituted for a variable $x(n)$, step SB2 follows.

In step SB2, the signal $S(n)$ and a carrier signal $\sin(\omega ct)$ are multiplied and a multiple result, namely the signal $S(n) \times \sin(\omega ct)$ is substituted for a variable $y(n)$, and then step SB3 follows.

In step SB3, according to the equation (6), the inner product $IP = x(n) \times x(n-1) + y(n) \times y(n-1)$ of vector $\vec{D_n}$, which corresponds to the present signal point $D_n$, which is to be decided, and vector $\vec{D_{n-1}}$, which corresponds to the former signal point $D_{n-1}$, is obtained and substituted for a variable z, and then step SB4 follows.

In step SB4, a vector $\vec{D'_{n-1}}$ is obtained by rotating the vector $\vec{D_{n-1}}$ by 90 degrees. According to the equation (8), as mentioned above, the inner product $IP' = -x(n) \times y(n-1) + y(n) \times x(n-1)$ of the vector $\vec{D_n}$ and $\vec{D'_{n-1}}$ is obtained and substituted for the variable w, and then follows step 5.

In step SB5, it is decided whether the variable z is not negative. If the result of this decision is "Yes", step SB6 follows.

In step SB6, it is decided whether the variable w is not negative. If the result of this decision is "Yes", step SB7 follows.

Figure 2:
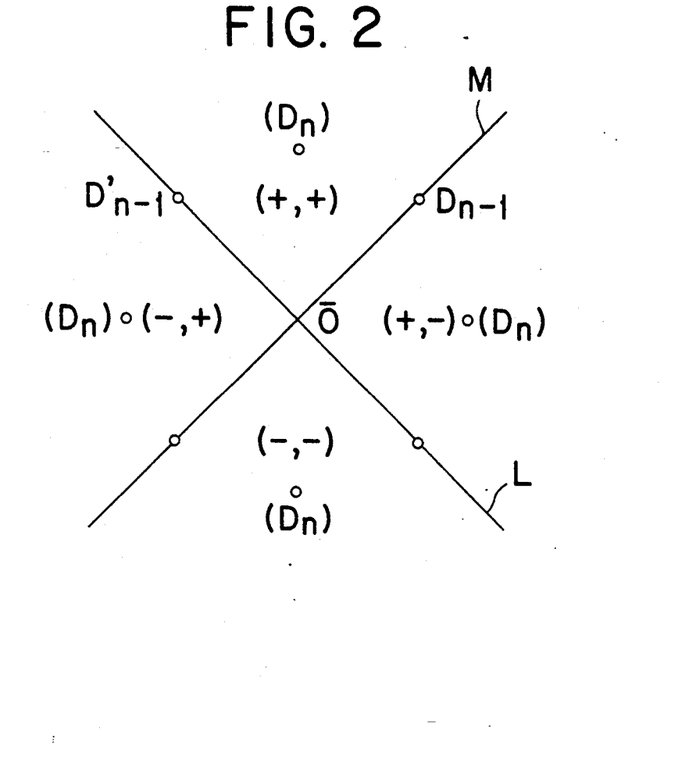
FIG. 2 is showing a decided area of a signal point $D_n$ based on a signal point $D_{n-1}$.

In step SB7, it is decided that the input signal falls into area $(+,+)$ of FIG. 2, on the ground that the combination of the sign of the variable z and the sign of the variable w becomes $(+,+)$, and after the output of the decision result which says that the phase shift $\Delta$ between the present input signal and the former input signal equals 0 degree, one series of commands ends.

If, on the other hand, the decision result of step SB6 is "No", in other words, the variable w is less than zero, step SB8 follows next.

In step SB8, it is decided that the input signal falls into area $(+,-)$ of FIG. 2, on the ground that the combination of the sign of variable z and the sign of the variable w becomes $(+,-)$, and after the output of the decision result which says that the phase shift $\Delta$ between the present input signal and the former input signal equals 270 degrees, one series of commands ends.

If, on the other hand, the decision result of step SB5 is "No", in other words, variable z is less than zero, step SB9 follows next.

In step SB9, it is decided whether the variable w is not negative. If the result of this decision is "Yes", step SB10 follows.

In step SB10, it is decided that the input signal falls into area $(-,+)$ of FIG. 2, on the ground that the combination of the sign of the variable z and the sign of the variable w becomes $(-,+)$, and after the output of the decision result which says that the phase shift $\Delta$ between the present input signal and the former input signal equals 90 degrees, one series of commands ends.

If, on the other hand, the decision result of step SB9 is "No", in other words, variable W is less than zero, step SB11 follows next.

In step SB11, it is decided that the input signal falls into area $(-,-)$ of FIG. 2, on the ground that the combination of the sign of variable z and the sign of the variable w becomes $(-,-)$, and after the output of the decision result which says that the phase shift $\Delta$ between the present input signal and the former input signal equals 180 degrees, one series of commands ends.

As explained above, by being characterized in having a $\pi/4$ shift QPSK modulated signal, when making the decision based on the input signal, the phase margin can be set to 90 degrees. Furthermore the software-processing of the DSP becomes simple when compared with prior art and also the number of instructions decreases.

What is claimed is:

1. A method for demodulating a serial quadriphase shift keying signal which is modulated using $\pi/4$ shift quadriphase shift keying comprising the steps of:
   providing a two dimensional plane defined by a phase of a modulated signal;
   defining a first vector corresponding to a first signal point to be determined;
   making a first inner product by the first vector and a second vector corresponding to a previously determined signal point;
   transforming the second vector into a third vector which is ninety degrees advanced in phase;
   making a second inner product of the first vector and the third vector;
   determining the region of phase space in which the first signal point belongs in the two dimensional plane in accordance with the first and second inner product making steps; and
   demodulating the quadriphase shift keying using said determined phase space region.

2. The method of claim 1 further comprising the step of:

dividing the two dimensional plane into four phase space regions each of which has ninety degrees.

3. A method for demodulating a quadriphase shift keying signal, comprising the steps of:

determining a region of phase space to which a serial signal modulated using $\pi/4$ shift quadriphase shift keying modulation belongs, the determination of the region of phase space further comprising the steps of:

(a) determining values corresponding to a first signal point to be determined and a previously determined signal point from representative digital values;

(b) providing a two dimensional plane defined by a phase of a modulated signal;

(c) defining a first vector using the values corresponding to the first signal point to be determined;

(d) making a first inner product by the first vector and a second vector defined using the values corresponding to the previously determined signal point;

(e) transforming the second vector into a third vector which is ninety degrees advanced in phase;

(f) making a second inner product of the first vector and the third vector;

(g) comparing the first inner product with the second inner product; and (h) determining the region of phase space in which the first signal point belongs in the two dimensional plane in accordance with comparisons of the first and second inner products;

determining a relative phase difference between the modulated serial signal and a previous modulated serial signal based on the determination of the region of phase space to which the modulated serial signal belongs; and demodulating the modulated serial signal based on the determination of the relative phase difference, thereby transforming the modulated serial signal into a demodulated serial signal.

4. The method of claim 3, the determination of the region of phase space further comprising the steps of:

(i) converting a series of analog modulated serial signals to a series of representative digital values in analog-to-digital means; and (j) applying the series of representative digital values to digital signal processing means.

* * * * *